ELECTRONIC CALCULATORS

Filed April 14, 1960

Inventors
D. WEIGHTON
& R. A. COSGROVE
By Holcombe, Wetherill & Brisebois
Attorneys United States Patent Office 3,145,295

Patented Aug. 18, 1964

3,145,295

ELECTRONIC CALCULATORS

Donald Weighton, Cambridge, and Reginald Arthur Cosgrove, London, England, assignors to Pye Limited, Cambridge, England, a British company
Filed Apr. 14, 1960, Ser. No. 22,231
Claims priority, application Great Britain Apr. 20, 1959
4 Claims. (Cl. 235—152)

The present invention relates to electronic calculators such as are employed for the rapid performance of arithmetical calculations and other problems.

Such calculators are often employed to perform arithmetical operations in accounting and other office work and the speed with which the calculations can be performed is limited by the time taken for an operator to enter the input data in the calculator and for the output device to present the answers. In the case where typewriters are used for the input of data to the calculator and for deriving output data from the calculator, an operator may also be typing other material between handling calculations, so that whilst a high speed calculator is desirable to avoid a delay in waiting for an answer to a problem presented to the calculator, it is in practice is in practice standing idle for a considerable percentage of time.

It is an object of the present invention to provide an arrangement whereby an electronic calculator can be more fully utilised.

According to the present invention an electronic calculator arrangement comprises a plurality of data stores for storing data to be fed to the calculator and switch means for selectively connecting any one of the data stores to the calculator. The data stores may also receive the output data from the calculator and the switch means operate so that any one data store is connected to the calculator for a period during which input data is fed to the calculator, the calculation is performed, and the output data is fed from the calculator back to the store.

The switch means may operate to connect the plurality of data stores to the calculator in succession and either mechanical or electronic switch means may be employed. Advantageously gate circuits, e.g. diode gates, may be employed as the electronic switch means. The switch means is preferably controlled by a control device which responds to an applied signal to operate the switch means so as to connect any desired data store to the calculator.

A typewriter may be associated with each data store for feeding data to the store and deriving output data from the store.

From another aspect the invention consists in an electronic calculator arrangement comprising a calculator, a plurality of data stores for storing input information to be fed to the calculator and output information derived from the calculator, switch means for selectively connecting any one of said data stores to said calculator and a switch control device which can be operated by signals which are associated with the respective data stores to cause the switch means to connect to the calculator any data store from which an associated operating signal is received.

Figure 1:
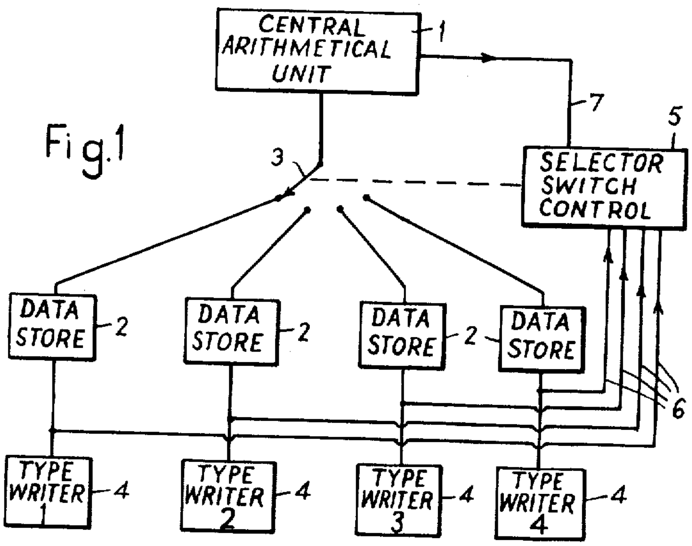
Figure 2:
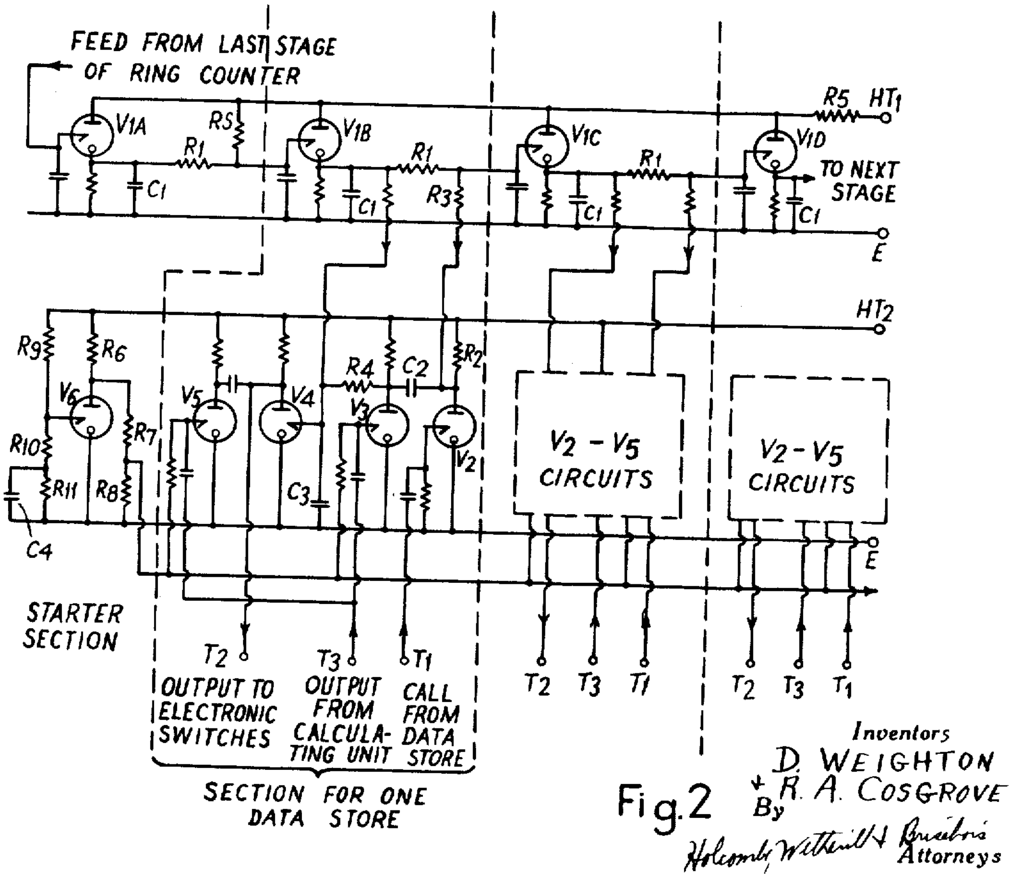

In order that the invention may be more fully understood reference will now be made to the accompanying drawings in which:

FIGURE 1 is a simplified block diagram of one embodiment of electronic calculator arrangement according to this invention, and FIGURE 2 is a circuit diagram of one embodiment of selector switch control unit.

Referring to FIGURE 1, the arrangement comprises a central arithmetical calculating unit 1 for performing arithmetical operations rapidly in accordance with input data fed to the unit. The input data can be fed to the unit from any one of a number of data stores 2 which are selectively connectable to the unit through a selector switch 3 which may be an electronic switch and comprise a plurality of diode gates, one connected to each data store. In the drawing, four data stores are shown but it will be understood that this number has only been chosen by way of non-limiting example and that a smaller or larger number of data stores may be associated with the calculating unit 1. Input information is fed to each data store 2 by means of a typewriter 4 associated with that store. The operation of the selector switch 3 is controlled by a selector switch control unit 5 which in turn is operated by means of signals fed from any of the data store positions over lines 6 and which can also be operated by a signal sent from the calculating unit over the line 7.

In operation the typewriters 4 are used for feeding input data to each store 2 and for deriving output data from the store. When input data is entered into any data store together with any programme instructions, a signal in the form of a pulse is sent from the position of that data store over the appropriate line 6 to the selector switch control unit 5 which operates the selector switch 3 to connect that data store to the central arithmetical unit 1. This latter unit then performs the calculations and the output information is fed back to the data store. The unit also sends a signal to the selector switch control unit over the line 7 indicating that the calculation has been completed and the selector switch control unit 5 will now operate in response to a further signal from any of the data stores to connect that store to the unit.

It will be seen that this arrangement enables several operators to use a single electronic calculating unit by providing each operator with a separate data store for input and output data and a selector switch which connects each of the stores to the calculating unit in turn as required.

Should all the operators be ready to use the calculating unit at the same time, one of them would have to wait for a maximum period equal to $T=nt$ where $n$ is the number of operators and $t$ is the time taken by the arithmetical unit to perform the longest operation. In practice the average waiting time will generally be very much less than this since the probability of all the operators requiring to use the calculting unit at the same time would be very small. Moreover, since the entry and printing out of the data together with any other tasks to be performed by the operator will take several seconds and the calculation time may be only a small fraction of a second, a large number of data stores may be connected to the calculator without the operators being aware of any significant waiting period for the handling of their data by the calculating unit. Thus although the illustrated embodiment only shows four data stores, in practice many more data stores and typewriters may be provided in association with a single calculating unit.

FIGURE 2 is a circuit diagram of one embodiment of selector switch control unit 5 employing cold cathode discharge tubes. The circuit diagram is divided vertically into section by broken lines, each of the sections being identical, apart from the starter section to the left of the diagram. An identical section is provided for each data store and typewriter. For the sake of clarity only one of the identical sections has been shown fully.

The upper row of tubes V1A to V1D represents a typical ring counter circuit consisting of a plurality of similar stages arranged continually to oscillate. As the potential at the cathode of one tube rises due to the charging up of the cathode capacitor C1, the potential is directly applied to the trigger electrode of the next tube via the resistor R1. A further positive potential is added to this trigger electrode from the high tension positive line HT2 through resistors R2 and R3 in the anode circuit of the appropriate "call" tube V2, as these tubes are not normally conducting, and the said trigger electrode is therefore raised sufficiently positive to strike the next tube of the ring counter.

When the next tube strikes the potential of the common HT positive line drops to the value of the burning potential of that tube, as the tube cathode is initially at earth potential. The previous tube has a charged cathode capacitor C1 and therefore the potential across the tube is considerably less than the burning potential and the tube is extinguished. The cycle repeats continuously and each stage in the ring is rendered conducting in sequence. For predictable operation of the circuit it is necessary to ensure that only one tube becomes conducting when the power supply is connected to the equipment, and this is achieved by the starting resistor RS connected between the common HT line and the electrode of tube V1B. When the HT supply is connected and no tube is conducting there is only a slight potential drop across the common HT resistor R5 due to the resistor chain including RS and R1, and the trigger electrode of V1B is connected to a point in this network that will be sufficiently positive to strike the tube. The increase in current flowing through R5 causes the potential at the trigger electrode of V1B to drop below that required for striking and as the ring counter oscillates V1B will not restrike until triggered in the normal way by the cathode potential of V1A. Connections are made to each side of R1 in each functioning stage of the counter, and the connection of RS in the V1A section prevents the use of this stage as a control stage for data store.

Each section in the lower row of tubes incorporates four cold cathode tubes V2 to V5. A single starter tube V6 is also provided. When the equipment is switched on it is necessary to set up the tubes in each section so that V3 and V5 are conducting and V2 and V4 are extinguished, and a connection is taken from the junction of resistors R7 and R8 to the trigger electrode of each tube V3 and V5. These resistors form a chain across the HT supply in series with R6, and the potential at the junction of R7, R8 is sufficient to cause each tube V3 and V5 to conduct. In so doing each tube will extinguish its associated tube V2 or V4, should that tube have struck inadvertently. There is a second resistor chain across the HT supply, R9, R10, R11, with a capacitor C4 connected across R11 and the trigger electrode of V6 is connected to the junction of R9, R10. The extra current flow required to charge C4 holds the potential at the trigger electrode of V6 down for a brief period after switching on, but V6 will strike as soon as C4 is sufficiently charged and the extra flow of current through R6 drops the potential at the junction of R7, R8 sufficiently below the striking potential required for each tube V3 and V5, so that these tubes will not automatically restrike whenever subsequently extinguished during normal operations, but will await the application of a positive pulse at the connection T3 as will be described.

As mentioned above there are as many "call" tubes V2 as input typewriters and data stores, and when any data store requires to be connected to the calculating unit a pulse is sent from its position to the trigger electrode of the appropriate "call" tube V2, via a terminal T1, which causes that tube to conduct and therefore reduces its anode potential. Now, when the counter ring cycles round to the associated tube for example tube V1B, the oscillation is stopped, as the trigger electrode of the following tube V1C is not raised to a sufficiently positive potential.

Also, when V2 strikes the drop in anode potential is passed via the coupling condenser C2 to the associated "end of call" tube V3, which is normally conducting, and the drop in anode potential is sufficient to extinguish this latter tube. This causes the anode of V3 to rise to HT potential so that when the associated ring counter tube V1B strikes and the capacitor C1 charges to a positive potential, the charge potential in C3 also rises sufficiently positive to cause "gate" tube V4 to conduct. This in turn extinguishes the "close gate" tube V5 which is normally conducting.

The data store is then connected to the calculating unit via an electronic switch, e.g. a diode gate, (not shown in FIGURE 2) operated by the "gate" tube V4 through terminal T2, and the data store can feed its information to the calculator which rapidly computes the answer and feeds it back to the data store for retention. At the end of this computation, the calculating unit produces a pulse which is fed via terminal T3 and causes both the "close gate" tube V5 and the "end of call" tube V3 to strike. The striking of the tube V5 extinguishes the "gate" tube V4 so disconnecting the input of the calculating unit from the data store, whilst the striking of the tube V3 extinguishes the "call" tube V2 and so raises the potential of the trigger electrode of the following tube V1C of the ring counter sufficiently to strike this tube and recommence the ring counter cycling.

Should an operator at any other data store position initiate a "call" pulse while the calculating unit is operative and the ring circuit is stationary, the associated "call" tube V2 will strike and extinguish the "end of call" tube V3, but the relevant "gate" tube V4 cannot strike as the cathode of the associated tube of the ring counter is not at a positive potential. The call is therefore "booked" but cannot be acted on until the ring counter comes round to this position.

It will be apparent that this system does not give selection in the order of calling, but in the order that the ring counter samples, but the handling time for each call is so small that this does not cause inconvenience. If desired however a system may be employed which deals with the calls in order of calling.

Whilst a particular embodiment has been described it will be understood that various modifications may be made without departing from the scope of this invention.

We claim:

1. In an electronic calculator arrangement comprising a calculating unit, a plurality of data stores and switch means for selectively connecting any one of the data stores to the calculating unit, the improvement which comprises selector switch control means for controlling the connection of any one of the data stores to the calculating unit, said selector switch control means comprising a ring counter having one stage for each data store, and a control circuit for each data store associated with each stage of the counter, each control circuit comprising four cold cathode gas discharge tubes, the first of said tubes being normally extinguished and being connected to control the conductance of the second of said tubes which is normally conducting, the third of said tubes being normally extinguished and being connected to control the conductance of the fourth of said tubes which is normally conducting, connections between said first and third tubes and the associated stage of the ring counter, means for feeding a striking potential to the first tube from the associated data store when it is desired to connect that store to the calculating unit, means for applying a change in potential caused by the striking of said first tube to stop the cycling of the ring counter and to extinguish said second tube, means for feeding a potential from the ring counter to strike said third tube which in turn extinguishes said fourth tube and connects the associated data store to the calculating unit whereby data in the store may be fed to the calculating unit, means for feeding a signal from the calculating unit at the end of a calculation to cause the second and fourth tubes to strike, which in turn respectively extinguish the first and third tubes so that said control circuit reverts to its initial condition, and the extinguishing of said first tube applying a potential to the ring counter to allow it to continue its cyclic operation.

2. The improvement according to claim 1 including a starter tube controlling the setting up of the tubes in each of said control circuits to ensure that when the equipment is switched on, said first and third tubes are extinguished and said second and fourth tubes are conducting.

3. In an electronic calculator arrangement comprising a calculating unit, a plurality of data stores and switch means for selectively connecting any one of the data stores to the calculating unit, the improvement which comprises selector switch control means for controlling the connection of any one of the data stores to the calculating unit, said selector switch control means comprising a cyclic counter having one stage for each data store, and a control circuit for each data store associated with each stage of the counter, each control circuit comprising four tubes, the first of said tubes being normally cut off and being connected to control the conductance of the second of said tubes which is normally conducting, the third of said tubes being normally cut off and being connected to control the conductance of the fourth of said tubes which is normally conducting, connections between said first and third tubes and the associated stage of the cyclic counter, means for feeding a potential from the associated data store to make the first tube conduct when it is desired to connect that store to the calculating unit, means for applying a change in potential caused by the conductance of said first tube to stop the cycling of the counter and to cut off said second tube, means for feeding a potential from the counter to cause said third tube to conduct, which in turn cuts off said fourth tube, and connects the associated data store to the calculating unit whereby data in the store may be fed to the calculating unit, means for feeding a signal from the calculating unit at the end of a calculation, to cause the second and fourth tubes to conduct, which in turn cuts off the first and third tubes so that said control circuit reverts to its initial condition and the cutting off of the first tube applying a potential to the counter to allow it to continue its cyclic operation.

4. In an electronic calculator arrangement comprising a calculating unit, a plurality of data stores and switch means for selectively connecting any one of the data stores to the calculating unit, the improvement which comprises selector switch control means for controlling the connection of any one of the data stores to the calculating unit, said selector switch control means comprising a ring counter having one stage for each data store, and a control circuit for each data store associated with each stage of the counter, each control circuit comprising four trigger devices, the first of said trigger devices being normally cut off and being connected to control the conductance of the second of said trigger devices which is normally conducting, the third of said trigger devices being normally cut off and being connected to control the conductance of the fourth of said trigger devices which is normally conducting, connections between said first and third trigger devices and the associated stage of the ring counter, means for feeding a trigger potential to the first trigger device from the associated data store when it is desired to connect that store to the calculating unit, means for applying a change in potential caused by the conductance of said first trigger device to stop the cycling of the ring counter and to cut off said second trigger device, means for feeding a potential from the ring counter to cause said third trigger device to conduct, which in turn cuts off said fourth trigger device and connects the associated data store to the calculating unit whereby data in the store may be fed to the calculating unit, means for feeding a signal from the calculating unit at the end of a calculation, to cause the second and fourth trigger devices to conduct which in turn cuts off the first and third trigger devices so that said control circuit reverts to its initial condition, and the cutting off of the first trigger device applying a potential to the ring counter to allow it to continue its cyclic operation.

References Cited in the file of this patent

UNITED STATES PATENTS

| | | |
|---|---|---|
| 2,611,813 | Sharpless et al. | Sept. 23, 1952 |
| 2,885,659 | Speilberg | May 5, 1959 |
| 2,899,570 | Johannesen | Aug. 11, 1959 |